United States Patent
Kawai et al.

(10) Patent No.: US 7,336,202 B2
(45) Date of Patent: Feb. 26, 2008

(54) TEMPERATURE MONITORING DEVICE

(75) Inventors: Sigekazu Kawai, Gunma (JP);
Tsutomu Ishikura, Oota (JP)

(73) Assignee: Sanyo Electric Co., Ltd.,
Moriguchi-shi, Osaka (JP)

( * ) Notice: Subject to any disclaimer, the term of this patent is extended or adjusted under 35 U.S.C. 154(b) by 380 days.

(21) Appl. No.: 10/475,005

(22) PCT Filed: Apr. 17, 2002

(86) PCT No.: PCT/JP02/00538

§ 371 (c)(1),
(2), (4) Date: Jan. 6, 2004

(87) PCT Pub. No.: WO02/086641

PCT Pub. Date: Oct. 31, 2002

(65) Prior Publication Data

US 2004/0178925 A1   Sep. 16, 2004

(30) Foreign Application Priority Data

Apr. 17, 2001   (JP) ............................. 2001-118457

(51) Int. Cl.
*G08C 19/12*   (2006.01)

(52) U.S. Cl. ........................... 340/870.17; 340/870.07; 340/870.16; 340/538; 320/106; 320/107

(58) Field of Classification Search ........... 340/870.17, 340/538, 870.18, 870.07, 657, 870.16; 361/28, 361/29, 42, 59; 324/133, 424, 134; 320/106, 320/107
See application file for complete search history.

(56) References Cited

U.S. PATENT DOCUMENTS

| | | | | | |
|---|---|---|---|---|---|
| 4,158,810 | A | * | 6/1979 | Leskovar | 324/127 |
| 4,689,752 | A | * | 8/1987 | Fernandes et al. | 700/292 |
| 4,709,339 | A | * | 11/1987 | Fernandes | 700/293 |
| 4,786,862 | A | * | 11/1988 | Sieron | 324/126 |
| 4,829,298 | A | * | 5/1989 | Fernandes | 340/870.27 |
| 4,904,996 | A | * | 2/1990 | Fernandes | 340/870.07 |
| 5,430,433 | A |   | 7/1995 | Shima | |

(Continued)

FOREIGN PATENT DOCUMENTS

EP   0 125 050 A1   4/1984

(Continued)

OTHER PUBLICATIONS

International Search Report dated Jan. 24, 2002.

(Continued)

*Primary Examiner*—Jeffery Hofsass
*Assistant Examiner*—Sisay Yacob
(74) *Attorney, Agent, or Firm*—McGinn IP Law Group, PLLC (57) ABSTRACT

Temperature measurement data obtained by measuring the temperature of a cable clamp (31) by a temperature sensor (320) is radio-transmitted from a temperature sensing unit (32) at a predetermined timing, and the radio-transmitted temperature measurement data is received by a receiving station (5), classified by the temperature sensing unit number, and stored in a temperature measurement data storage area (502A). The temperature measurement data transmitted from twelve temperature sensing units (32) can be received by one receiving station (5).

19 Claims, 10 Drawing Sheets

U.S. PATENT DOCUMENTS 5,565,783 A * 10/1996 Lau et al. ................... 324/522
6,349,268 B1 * 2/2002 Ketonen et al. ............ 702/130

FOREIGN PATENT DOCUMENTS

| JP | 59-57399 | 4/1984 |
| JP | 63-178696 | 7/1988 |
| JP | 5-66714 | 3/1993 |
| JP | 5-128387 | 5/1993 |
| JP | 7-107634 | 4/1995 |
| JP | 9-210799 | 8/1997 |
| JP | 10-162280 | 6/1998 |
| JP | 11-88967 | 3/1999 |
| JP | 11-142253 | 5/1999 |
| JP | 2000-252857 | 9/2000 |
| JP | 2000-286987 | 10/2000 |
| JP | 2001-21661 | 1/2001 |
| JP | 2001-34333 | 2/2001 |

OTHER PUBLICATIONS

International Preliminary Examination Report dated Apr. 30, 2003.

* cited by examiner

TEMPERATURE MONITORING DEVICE

The present application is based on Japanese patent application No.2001-118457, the entire contents of which are incorporated herein by reference.

TECHNICAL FIELD

This invention relates to a temperature monitoring device and particularly to a temperature monitoring device that can safely monitor the temperature change of a monitored object which is difficult for workers to access safely.

BACKGROUND ART

Conventionally, a thermo-sensing label is attached to main circuit connection of transformer station and electric power-applied section of high-voltage cable such that its color changes to indicate that a state of exceeding a predetermined temperature continues for a certain period for the purpose of constantly supplying electric power, thereby allowing the maintenance worker to visually monitor it.

Figure 1:
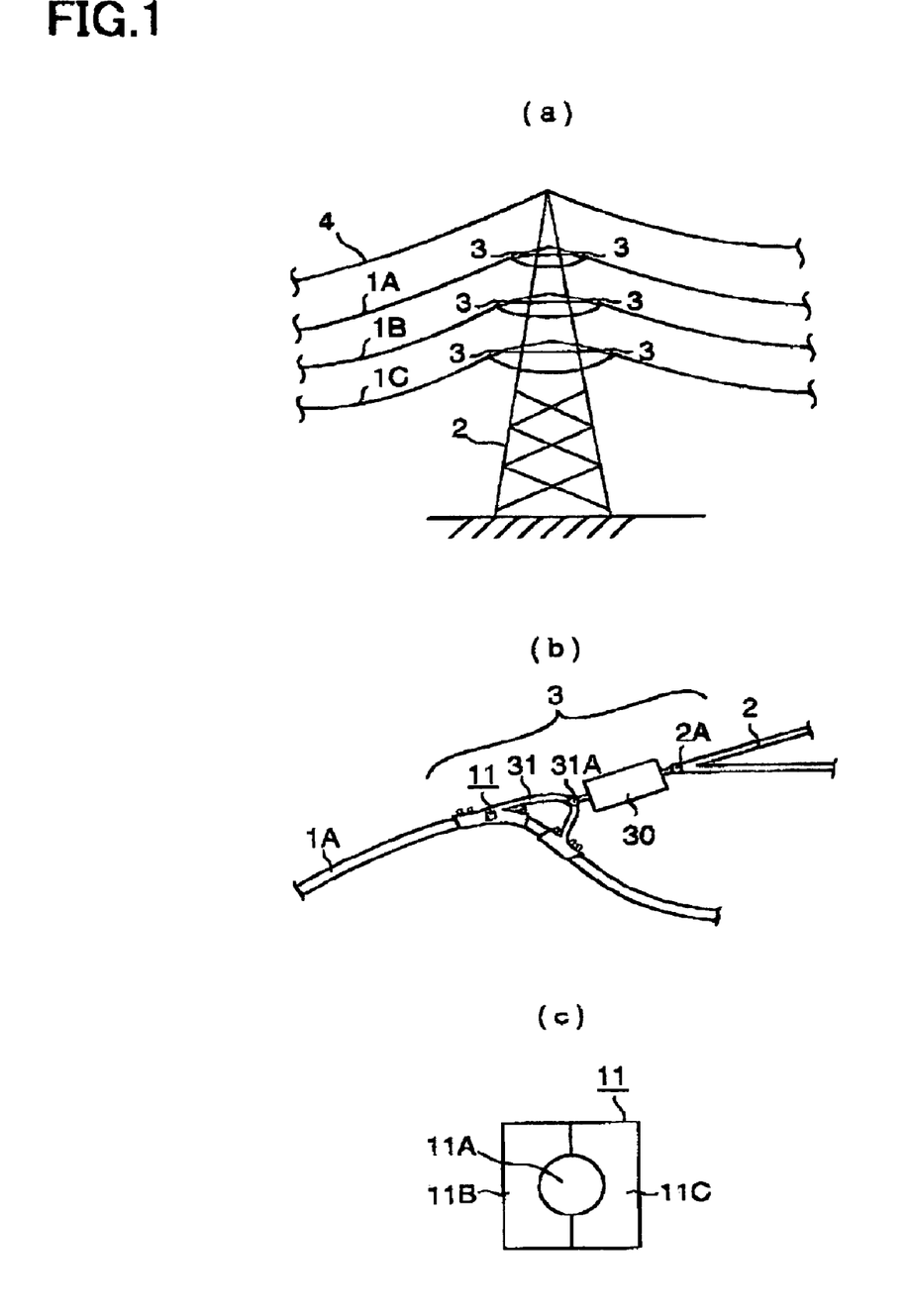
FIG. 1 is an illustration showing the schematic composition of the conventional power transmission facility.

FIG. 1(a) shows the schematic structure of a power transmission tower 2. It is composed of the power transmission tower 2 that supports transmission lines 1A, 1B and 1C (each having two transmission lines), transmission-line supporting portions 3 provided between the power transmission tower 2 and the transmission lines 1A, 1B and 1C, and an optical ground wire (OPGW) 4 provided on the top of the power transmission tower 2.

FIG. 1(b) shows partially the supporting portion 3. It is composed of an insulator 30 that insulates the power transmission line 1A from the power transmission tower 2, a cable clamp 31 that is supported through the insulator 30 by the power transmission tower 2 while holding the transmission line 1A, and a thermo-sensing label 11 that is attached to the surface of the cable clamp 31. The insulator 30 is fixed to an insulator fixing portion 31A of the cable clamp 31 and to a fixing portion of the power transmission tower 2. The thermo-sensing label 11 is also attached to the cable clamps 31 of the other transmission lines 1B and 1C.

FIG. 1(c) shows the details of thermo-sensing label 11. It is composed of a temperature indicating section 11A that is of a thermo-sensitive material whose color changes according to temperature, and temperature index sections 11B (red [higher than 65° C.]) and 11C (yellow [higher than 50° C.]) that indicate the relation of color indicated by the temperature indicating section 11A and the temperature. The temperature indicating section 11A has such irreversibility that the state of having the color once changed is retained. For example, when the temperature of cable clamp 31 is kept higher than 65° C. for a certain time due to electrical overload, its color changes to red and after that the color changing state is retained. Therefore, when it is found in the maintenance check that the thermo-sensing label 11 has the color changed, it can be visually and easily checked that the cable clamp 31 reached a high temperature. In case of transmission line, when loosing of a bolt in the cable clamp 31 for fixing the transmission line is generated by its vibration due to wind, the fixing portion may have the resistance value changed and generate heat. If power transmission is continuously conducted in such a state, the transmission line may be broken by heat.

Japanese patent application laid-open No. 5-66714 discloses a thermo-sensing label that has a temperature indicating section of a thermo-sensitive material with reversibility. In the thermo-sensing label, the transparency of the thermo-sensitive material varies between transparent and white opaque depending on temperature, and the thermo-sensitive material has reversibility in transparency. Therefore, the thermo-sensing label can be used repeatedly.

However, in the conventional temperature monitoring device using the thermo-sensing label, there is a problem that even when a periodical temperature change not reaching the extraordinary temperature occurs at the electric power-applied section due to an increase in amount of current carried, it cannot be detected since the device is designed to detect that its monitored object reaches an extraordinary temperature.

Also, in the conventional temperature monitoring system, it is necessary to visually check the color change of temperature indicating section. Therefore, in such a place that cannot be easily accessed by the maintenance worker for safety reasons, the object to be monitored will be subject to limitations. When remote monitoring by a camera etc. is employed instead of visually checking, it will be costly.

It is an object of the invention to provide a temperature monitoring device that can easily obtain temperature measurement results according to a situation of monitored object and that can safely at low cost monitor a temperature without having any monitored object limited during a long term.

DISCLOSURE OF INVENTION

According to the invention, a temperature recording device having a memory to store temperature measurement data based on measurements of temperature detector is attached to an electric power-applied section, e.g., main circuit connection or high-voltage cable. The temperature recording device is provided with a specific identification number. It transmits a temperature measurement data, which is obtained by conducting a measurement of temperature at predetermined measurement intervals, at a predetermined transmit timing that is determined based on the identification number and a time data to be set as transmit interval for temperature measurement data, through wireless communication to a reception station. Thus, it can be rapidly detected that the electric power-applied section reaches an extraordinary temperature.

BEST MODE FOR CARRYING OUT THE INVENTION

Temperature monitoring device for electric power-applied section of the invention is explained below in reference to the drawings.

Figure 2:
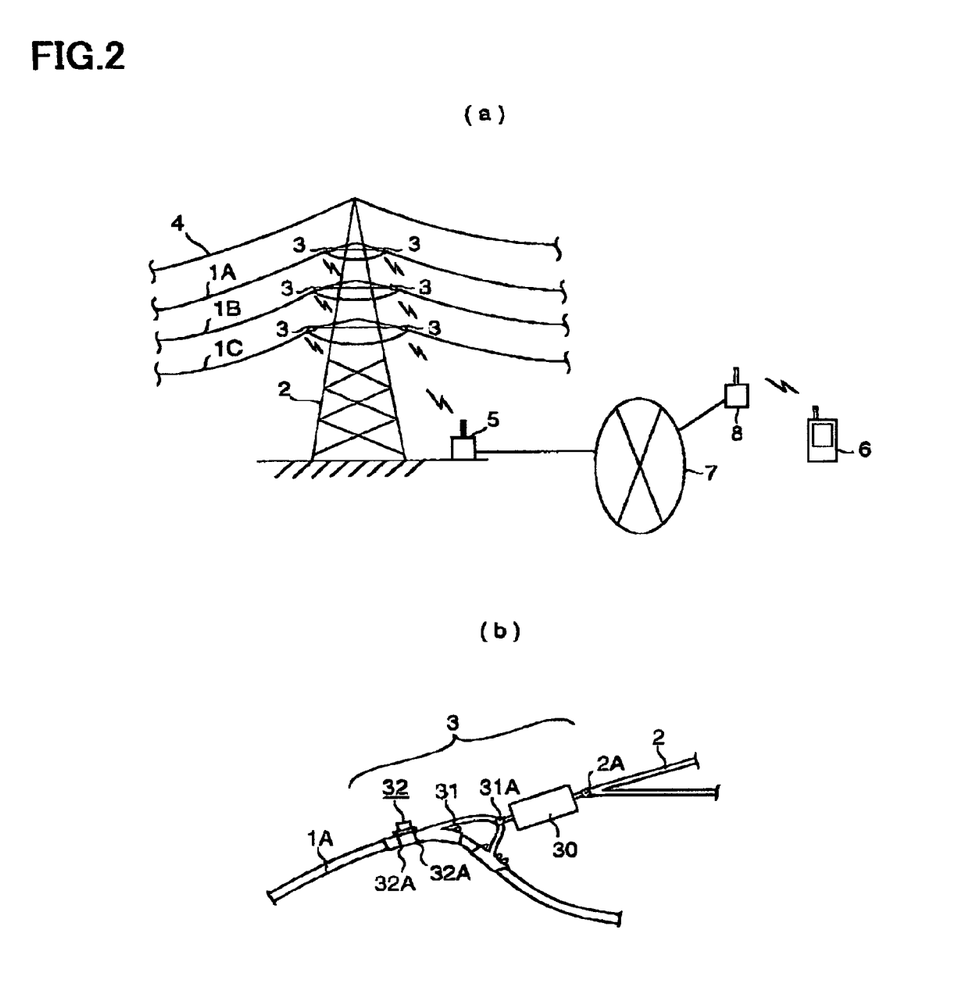
FIG. 2 is an illustration showing the schematic composition of a temperature monitoring device in a preferred embodiment according to the invention.

FIG. 2 shows a temperature monitoring device in a preferred embodiment of the invention, where FIG. 2(a) shows the schematic composition of a power transmission tower in which the temperature monitoring device is installed The temperature monitoring device is composed of: a power transmission tower 2 that supports transmission lines 1A, 1B and 1C (each having two transmission lines); transmission-line supporting portions 3 provided between the power transmission tower 2 and the transmission lines 1A, 1B and 1C; an optical ground wire (OPGW) 4 provided on the top of the power transmission tower 2; a reception station 5 that receives radio wave which includes a temperature measurement data to be detected by a temperature detector (described later) for the supporting portions 3 provided on the transmission lines 1A, 1B and 1C; a portable-type wireless terminal device 6 that can wirelessly communicate with the reception station 5; a communication network 7, such as the Internet, that is connected to the reception station 5; and a wireless communication station 8 that controls the wireless terminal device 6 and the communication network 7 to enable the wireless communication therebetween. In FIG. 2, the transmission lines 1A, 1B and 1C each located on the front side are shown and the other transmission lines 1A, 1B and 1C each located on the back side are not shown, but they are supported through the supporting portions 3 by the power transmission tower 2 in like manner.

The reception station 5 has a storing section that receives radio wave including a temperature measurement data to be wirelessly transmitted from the temperature detector and stores it in time series. When it receives a read command from the wireless terminal device 6, it transmits the temperature measurement data stored in the storing section through radio wave to the wireless terminal device 6.

FIG. 2(b) is an enlarged view of the supporting portion 3 for transmission line 1A. The supporting portion 3 is composed of: an insulator 30 that insulates the power transmission line 1A from the power transmission tower 2; a cable clamp 31 that is supported through the insulator 30 by the power transmission tower 2 while holding the transmission line 1A; a temperature detector 32 that has a temperature detector to detect temperature of the cable clamp 31; and a band-shaped fitting 32A for fixing the temperature detector 32 closely to the surface of cable clamp 31. The insulator 30 is fixed to an insulator fixing portion 31A of the cable clamp 31 and to a fixing portion 2A of the power transmission tower 2. The temperature detector 32 is also attached to the other transmission lines 1B and 1C in like manner.

Figure 3:
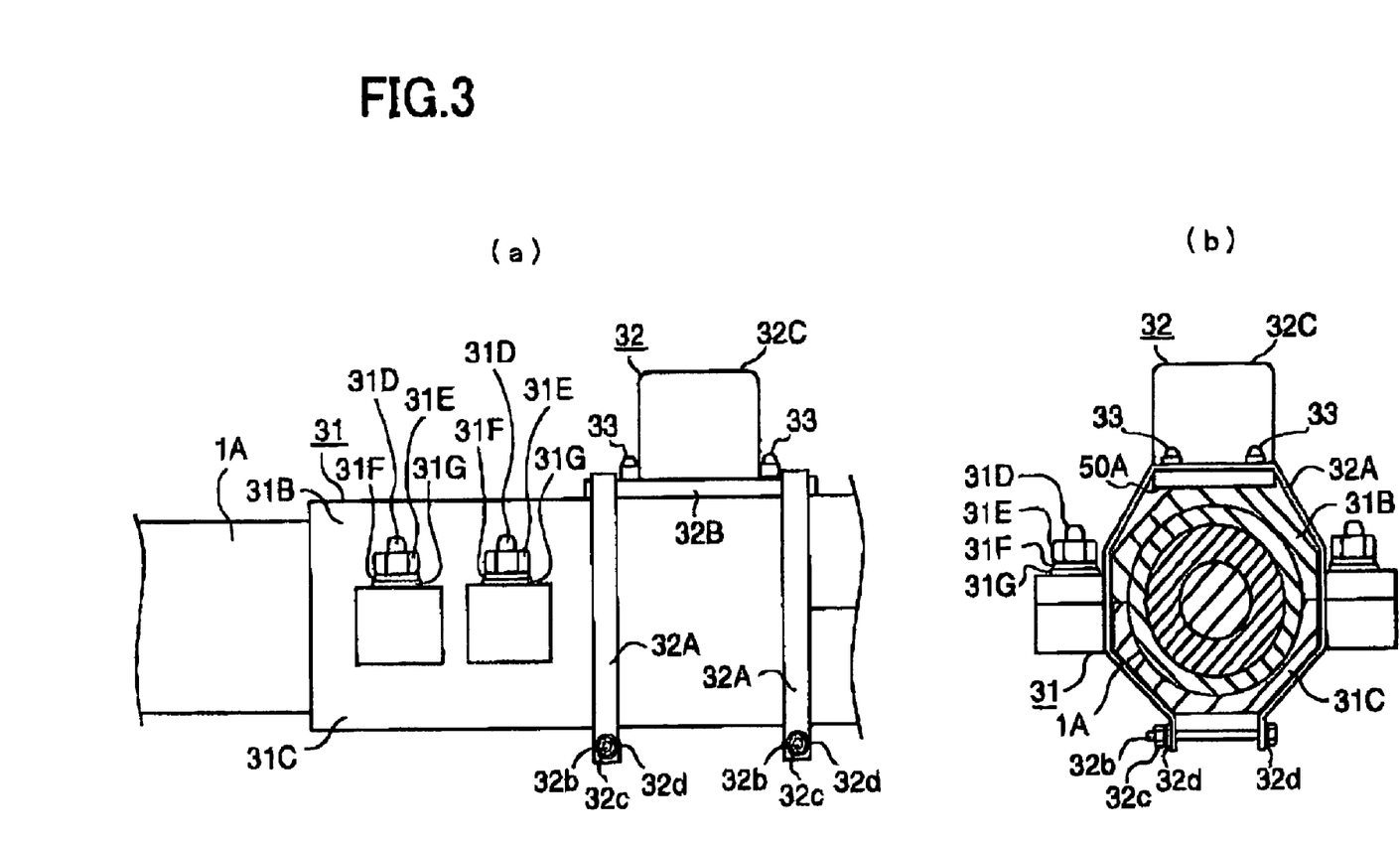
FIG. 3(a) is a side view showing a cable clamp to which a temperature detector is attached.
FIG. 3(b) is a cross sectional view showing the cable clamp to which the temperature detector is attached.

FIG. 3 is an enlarged view of the cable clamp 31 with the temperature detector 32 mounted, where FIG. 3(a) is viewed from the side and FIG. 3(b) is viewed in the longitudinal direction of the power transmission line 1A. The cable clamp 31 is fixed to the power transmission line 1A by fastening clamp members 31B and 31C, which are of metal such as aluminum, by bolts 31D, nuts 31, spring washers 31F and washers 31G. The fitting 32A fixes the temperature detector 32 closely to the periphery of the cable clamp 31 by using bolts 32b, nuts 32c and washers 32d.

Figure 4:
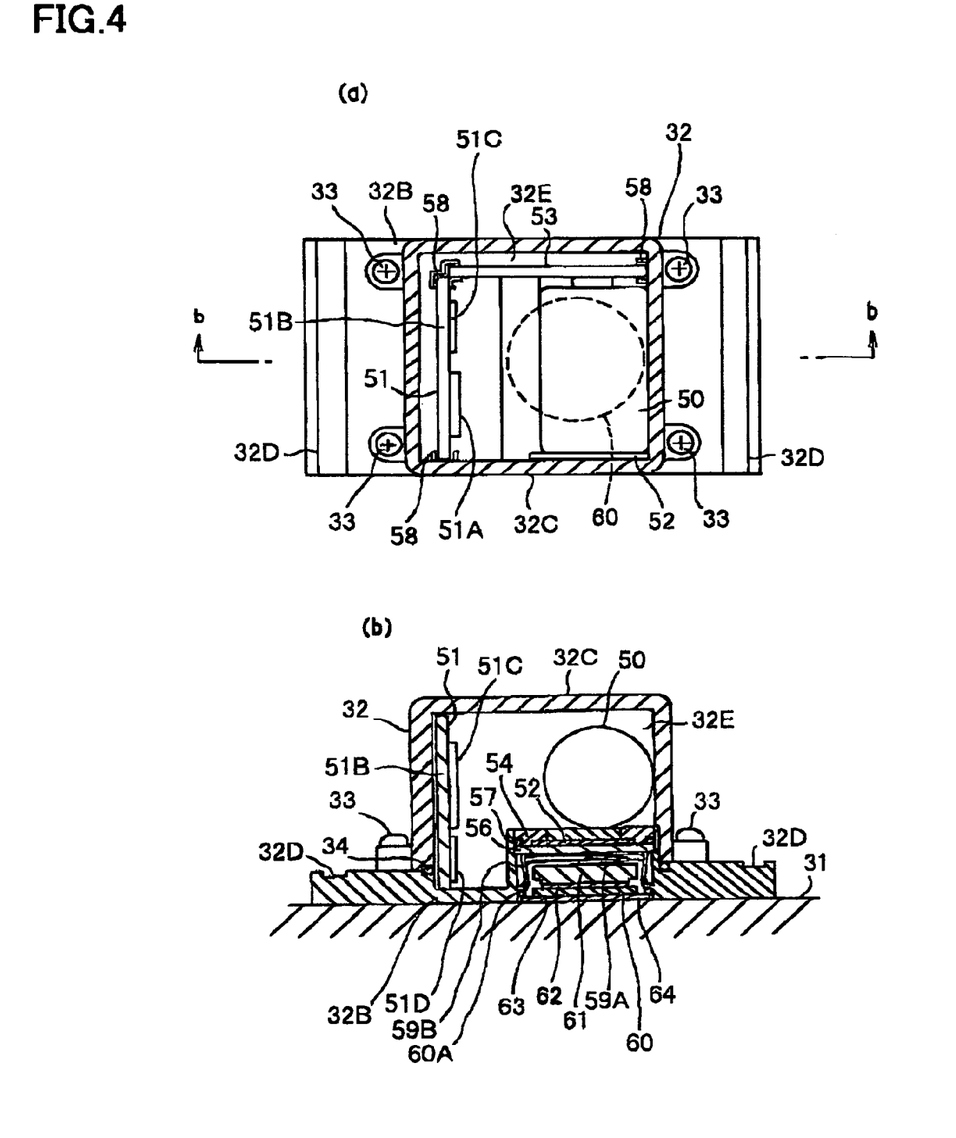
FIG. 4(a) is a partially broken top view showing the temperature detector.
FIG. 4(b) is a cross sectional view cut along the line b-b in FIG. 4(a).

FIG. 4 is an enlarged view of the temperature detector 32, where FIG. 4(a) shows its internal structure viewed from the top and FIG. 4(b) shows the internal structure cut along the line b-b in FIG. 4(a). For convenience of explanation, FIG. 4(a) shows a watertight section 32E to accommodate a wireless communication section etc. while having the top opened.

The temperature detector 32 is composed of a base 32B of ABS resin having good heating resistance and low-temperature resistance, and a protective case 32C. The base 32B has a groove 32D to engage the fitting (described earlier) when it Is secured to the cable clamp 31, and it is integrated with the protective case 32C while being screwed up with four screws 33 to form the watertight section 32E inside them. A sealing member 34 to prevent water etc. from invading the watertight section 32E is inserted to the junction between the base 32B and the protective case 32C.

Included in the watertight section 32E are: a lithium battery 50 as power source; the wireless communication section 51 on which semiconductor circuit units for conducting the temperature measurement operation and the wireless communication with outside are mounted, its substrate surface being positioned in the direction vertical to the power supplying direction of transmission line; a conductive member 52 that electrically connects the wireless communication section 51 to the negative electrode of the lithium battery 50; a conductive member 53 that electrically connects the wireless communication section 51 to the positive electrode of the lithium battery 50; a supporting member 54 that secures the conductive member 53 inside the watertight section 32E; a separating member 56 that supports the conductive member 52 and a ground terminal 59B (described later) to isolate them each other; and a sealing member 57 that prevents water from invading the watertight section 32E through the separating member 56. The conductive member 53 is positioned by a supporting member 58 such that it contacts the positive electrode of the battery 50.

The wireless communication section 51 includes: a semiconductor device 51A that has a control circuit to control the wireless transmission operation; a substrate 51B on which a wiring pattern for circuit wiring and radio-wave transmission is formed, the substrate serving to transmit radio wave as an antenna in the wireless transmission operation; a semiconductor device 51C that has a control circuit to control power supplied to the wireless communication section 51; and a semiconductor memory 51D that stores various data necessary for temperature measurement and transmission operation The wireless communication section 51 is positioned by a supporting member 58 such that it vertically stands in the watertight section 32E.

The base 32B accommodates detachably a temperature sensor section 60 including a lithium battery 61, a semiconductor chip 62 with a temperature sensor, a circuit board 63 etc. in an opening at the bottom. The temperature sensor section 60 is electrically connected to the wireless communication section 51 located inside the watertight section 32E through a spring-shaped signal input/output terminal 59A and a ground terminal 59B provided in the opening, whereby the wireless transmission of temperature measurement data is enabled. Also, an insulating member 64 of a material such as silicon with good thermal conductivity is provided between the temperature sensor section 60 and the cable clamp 31. Furthermore, a sealing member 60A to prevent water etc. from invading the temperature sensor section 60 is provided contacting the periphery of the temperature sensor section 60 inside the opening.

The temperature sensor section 60 accommodates the lithium battery 61, the semiconductor chip 62 with a temperature sensor, the circuit board 63 etc. in a metal case of stainless etc., and it has a signal input/output section 41 at the top of the metal case, a ground terminal 42 at the cylindrical side thereof and a thermometric surface at the bottom thereof. The semiconductor chip 62 stores a specific ID (hereinafter referred to as temperature sensor ID) and temperature detector number that is assigned at initial setting. The circuit pattern forming surface of the semiconductor chip 62 is placed facing the circuit board 63.

The temperature sensor uses a PN-junction type diode provided on the semiconductor chip 62 to detect the temperature of cable clamp 31 based on a difference between the forward voltage and the reference voltage of the PN-junction type diode whose forward voltage has a dependency on temperature. The temperature measurement data thus obtained is encoded and then outputted.

Figure 5:
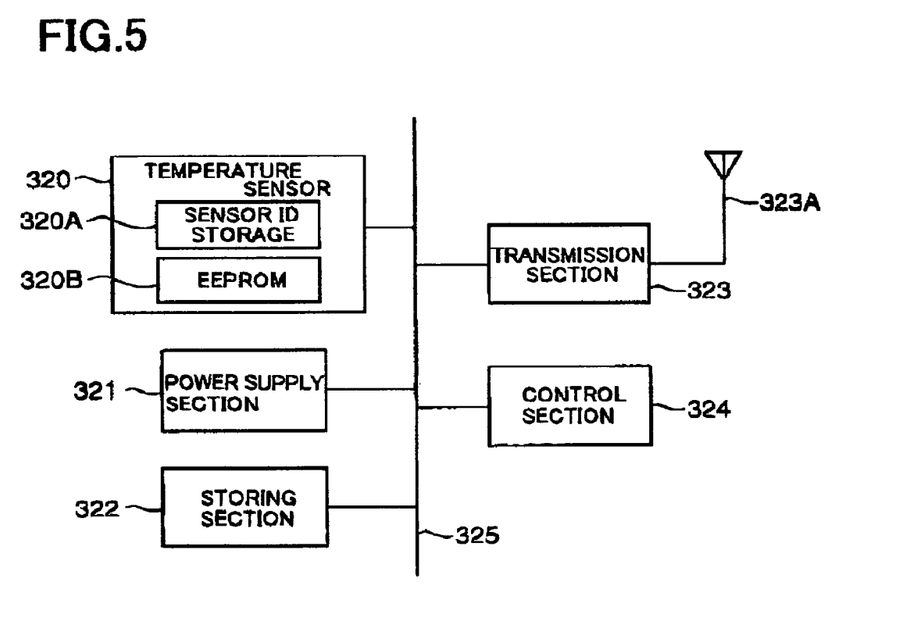
FIG. 5 is a block diagram showing a circuit composition of the temperature detector.

FIG. 5 shows the circuit composition of the temperature detector 32. It is composed of: a temperature sensor section 320 to measure the temperature of the transmission line 1A; a sensor ID storage 320A to store the above-mentioned temperature sensor ID and EEPROM 320D to store the temperature detector number, provided in the temperature sensor section 320; a power supply section 321 to control power supplying; a storing section 322 to store temporarily time data of temperature measurement interval, time data of transmission interval and calculation results in a control section; a transmission section 323 to transmit wirelesely the temperature measurement data through a transmission antenna 323A; the control section 324 to control the respective sections of the temperature detector 32; and a bus 325 to connect the respective sections one another.

The control section 324 has a clock circuit to conduct clock operation by counting a clock signal generated by a reference clock generator (not shown), and a data input/output section (not shown) to connect with a terminal device such as personal computer.

The transmission section 323 transmits wirelessly temperature measurement data encoded based on a temperature of the cable clamp 31 to be outputted from the temperature sensor section 320. It is preferred that a frequency used for wireless transmission does not need a procedure such as license application or need only a simple procedure. Also, it is preferred that electric field intensity is low such that it does not cause any communication failure or interference.

The control section 324 controls the transmission section 323 to conduct wireless transmission at a transmission interval obtained by adding a transmission timing compensation value based on the temperature detector number to a preset time data (e.g., 10 seconds) of transmission interval when it transmits a temperature measurement data. Also, the control section 324 allows time data of transmission to be rewritten through data input/output section (not shown) from outside.

Figure 6:
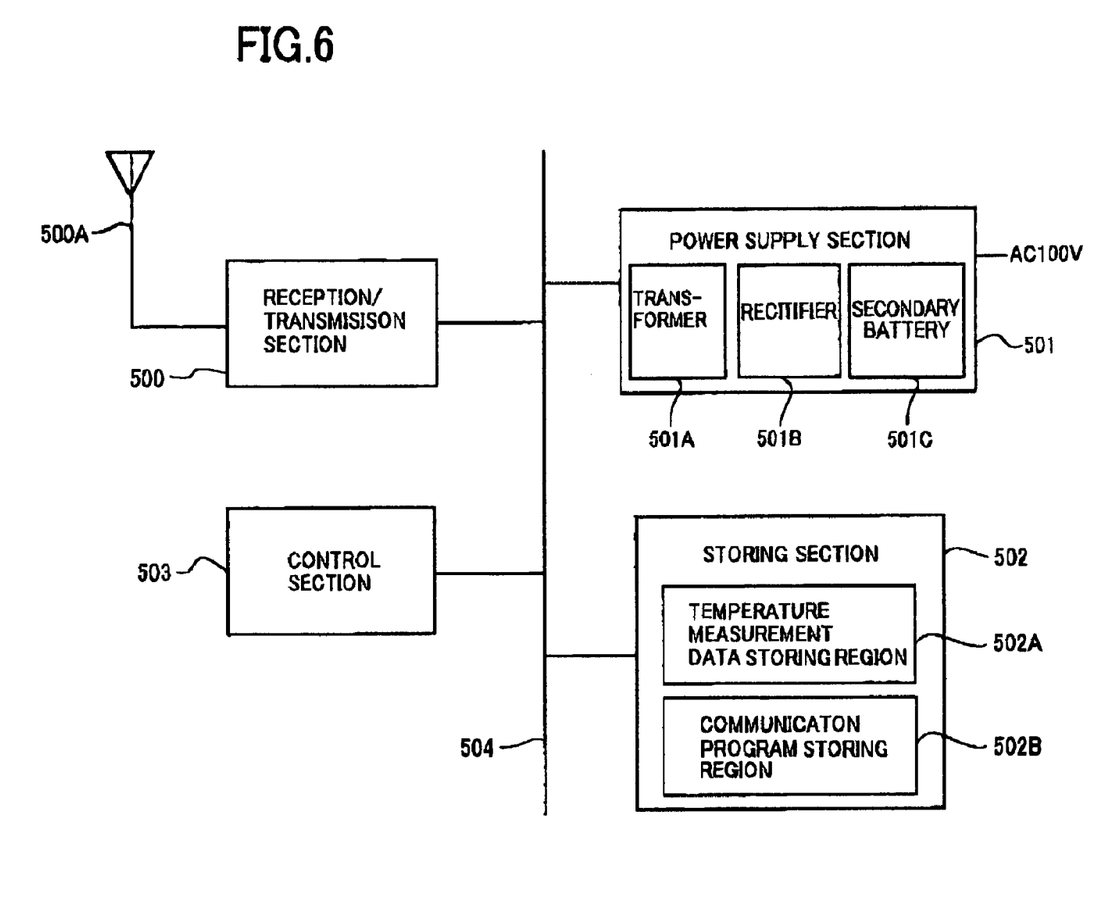
FIG. 6 is a block diagram showing a circuit composition of reception station 5.

FIG. 6 shows the circuit composition of the reception station 5. It is composed of: a reception/transmission section 500 to conduct the communication of temperature measurement data with the temperature detector 32 or wireless terminal device 6 through an antenna 500A; a power supply section 501 to control power supplying; a storing section 502 to store in time series the temperature measurement data transmitted from the temperature detector 32 while classifying the data for each temperature detector; a control section 503 to control the storing operation of temperature measurement data and the communication operation with the wireless terminal device 6; and a bus 504 to connect the respective sections one another. One reception station 5 can receive temperature measurement data to be transmitted from twelve temperature detectors 32, The power supply section 501 lowers AC 100V supplied through wiring by a transformer 501A, DC-converting it by a rectifier 501B, then supplying power to the circuit. It is also provided with a secondary battery 501C such as rechargeable battery in preparation for a trouble such as power outage The secondary battery 501C is recharged with power supplied through wiring to the circuit and supplies power to the circuit when power is not supplied through the wiring.

The storing section 502 is a semiconductor memory to be detachably installed in the reception station. It has a temperature measurement data storing region 502A that stores temperature measurement data to be transmitted from the temperature detector 32, and a program storing region 502B that stores a storing program used for storing the temperature measurement data and a communication program used in communications with the wireless terminal device 6.

The control section 503 has the data input/output section (not shown) to connect with a terminal device such as personal computer, and a protocol controller (not shown) to connect with the communication network 7. It can conduct data communications through the Internet using TCP/IP as communication protocol It allows the storing program and communication program stored in the program storing region 502B of the storing section 502 to be rewritten from outside. Also, the control section 503 has a clock circuit to conduct clock operation by counting a clock signal generated at a reference clock generator (not shown).

Figure 7:
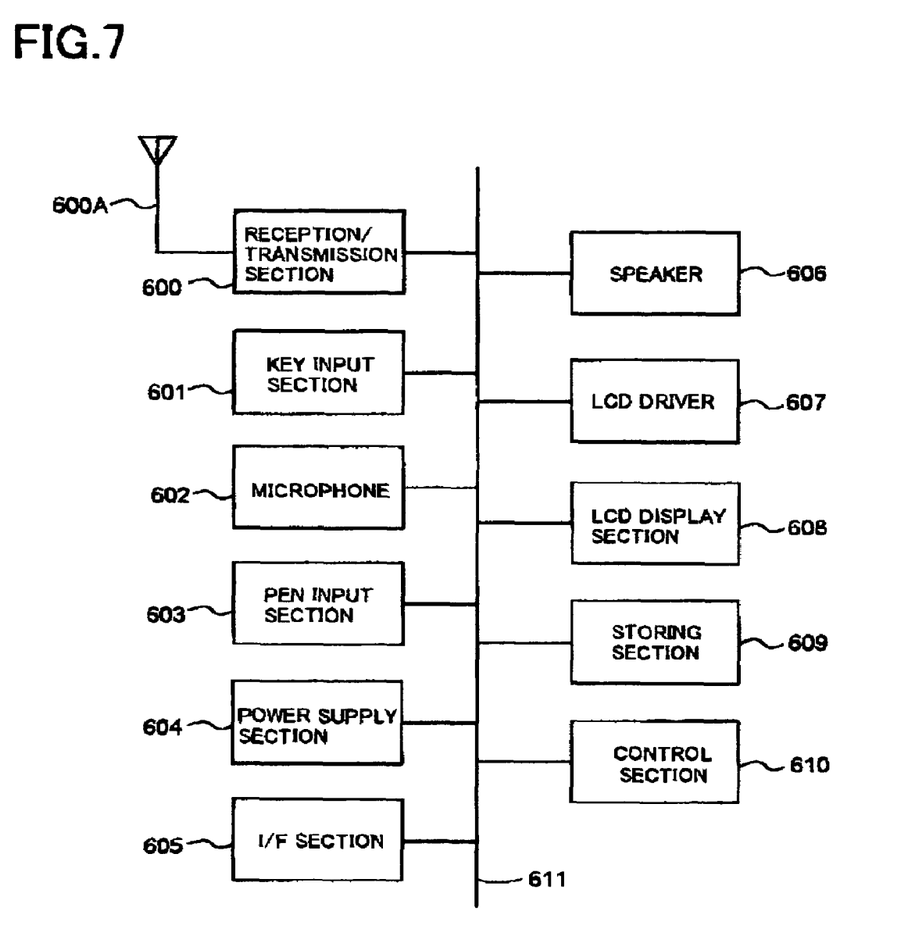
FIG. 7 is a block diagram showing a block diagram showing a circuit diagram of wireless terminal device 6.

FIG. 7 shows a PDA (personal digital assistant) device used as the wireless terminal device 6 in this embodiment. It is composed of: a reception/transmission section 600 to conduct the communication of temperature measurement data etc. with the reception station 5 through an antenna 600A; a key input section 601 to input characters or numerals through keys; a microphone 602 to be inputted of voice; a pen input section 603 to input characters, numerals, functional buttons etc. through an input pen, the pen input section being provided in LCD display (described later); a power supply section 604 to control power supplying; an interface (I/F) section 605 to connect with a terminal device such as personal computer or detachable memory device etc.; a speaker to output sound; a LCD driver 607 to control the display operation of characters, images etc.; LCD display section 608 to display characters, images etc. while being controlled by the LCD driver 607; a storing section 609 to store a program used to control the respective sections; a control section 610 to control the respective sections; and a bus 611 to connect the respective sections one another.

The operation of temperature monitoring device of the invention will be explained below with reference to the drawings.

(1) Input of Initial Set Value to Temperature Detector 32

The operator connects a terminal device such as personal computer to the data input/output section of control section 324 and sets a temperature measurement interval and a transmission interval, before installing the temperature detector 32. Hereinafter, it is assumed that the temperature measurement interval and the transmission interval are the same period and the transmission is carried out after the measurement of temperature. The control section 324 stores, as initial set values, time data (e.g., ten seconds) of temperature measurement interval and transmission interval into the storing section 322. After the initial values are stored into the storing section 322, the control section 324 transfers, as confirmation information, the temperature sensor ID and initial set value of temperature sensor 320 to the terminal device. In the case that one reception station 5 receives temperature measurement data from a plurality of temperature detectors 32, a temperature detector number is set to EEPROM 320B of each temperature detector 32. In case of the power transmission tower 2 in FIG. 2, the reception station 5 receives temperature measurement data outputted from the twelve temperature detectors 32, where temperature detector numbers, No. 0 to No.11 are assigned to the respective temperature detectors.

(2) Input of Initial Set Value to Reception Station 5

The operator connects a terminal device such as personal computer, which is used in the initial setting of temperature detector 32, to the data input/output section of control section 503 and stores the temperature detector number of temperature detectors 32 placed in the reception area of reception station 5 into the program storing region 502B of storing section 502, before installing the reception station 5. Thereby, when the reception station 5 receives a temperature measurement data including temperature sensor ID and temperature detector number, it can store the data into temperature measurement data storing region 502A while classifying the data for each temperature detector number (3) Installing of Temperature Detector 32

After the initial setting, the on-site worker attaches the insulating member 64 to the thermometric surface of the temperature sensor 60 of each temperature detector 32 using an adhesive material. Then, the temperature detector 32 is mounted on the surface of cable clamp 31. The on-site worker positions the insulating member 64 to contact uniformly the surface of cable clamp 31, and then fixes the temperature detector 32 using the fitting 32A. After the mounting, the on-site worker confirms the checker who obtains temperature measurement data whether or not a temperature measurement data can be obtained from the reception station 5 by the wireless terminal device 6. After he confirms the normal operation based on the temperature measurement data obtained, the checking of temperature starts.

(4) Temperature Measurement Operation

The temperature detector 32 measures the temperature of cable clamp 31 at a temperature measurement interval based on the initial set value. The temperature detector 32 detects the temperature of cable clamp 31 with the temperature sensor section 320. The temperature sensor section 320 encodes electrical signal corresponding to temperature and outputs it as temperature measurement data to the control section 324. The control section 324 stores temporarily the temperature measurement data into the storing section 322. Also, the control section 324 calculates the transmission timing based on temperature detector number stored in EEPROM 320S.

(5) Transmission Operation of Temperature Measurement Data

Figure 8:
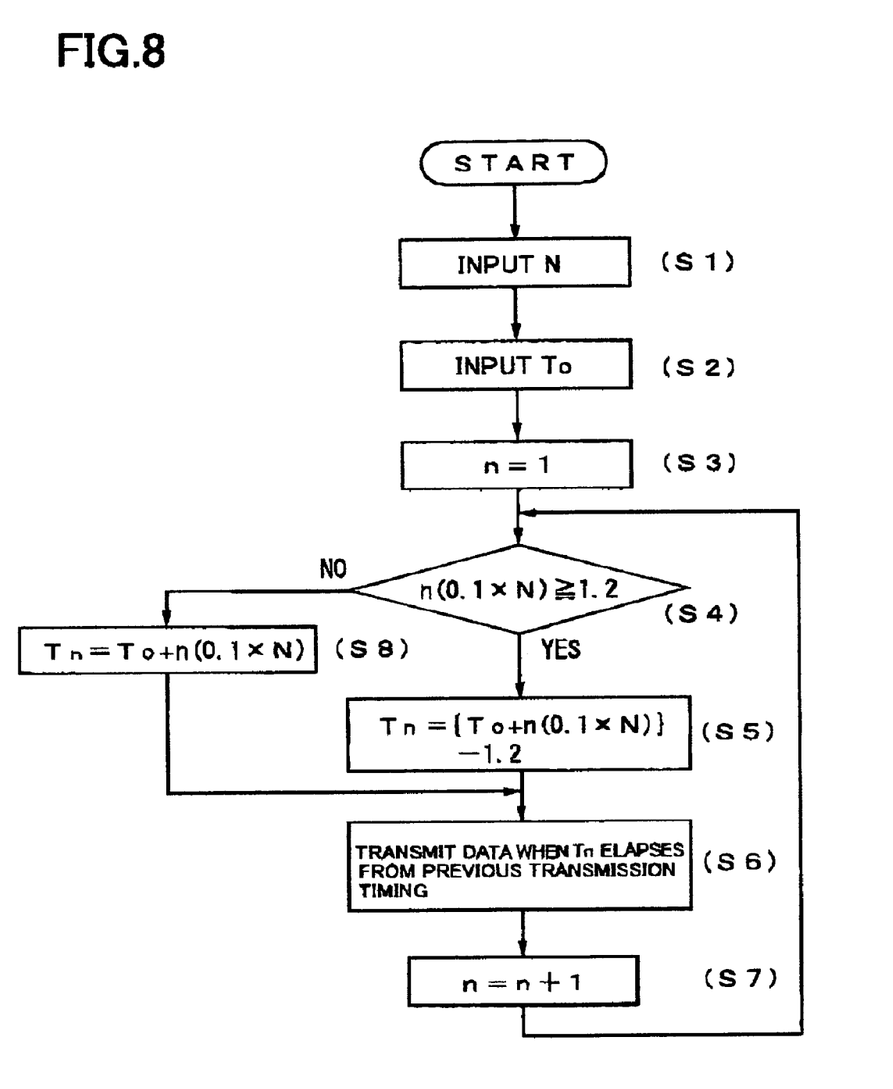
FIG. 8 is a flow chart showing a procedure for calculating a transmit timing in control section of the temperature detector.

FIG. 8 shows a flow chart for calculating transmission timing in the control section 324. When the calculation command of transmission timing is input, the control section 324 reads out a temperature detector number N stored in EEPROM 320B (S1) Then, time data of transmission interval $T_0$ is read from the storing section 322 (S2). Transmission count number n is set (S3), and transmission timing Tn is calculated using the next formula (1):

$$Tn = T_0 + n(0.1 \times N) \quad (1)$$

$T_0$=transmission interval (sec.)

N=temperature detector number

The transmission interval $T_0$ is set to be 10 sec. in initial setting and the transmission timing Tn is calculated based on the temperature detector number. For example, for N=0, the transmission timing Tn of temperature detector 32 is constantly sec. For N=1, the transmission timing Tn of temperature detector 32 is a value obtained by adding n(0.1) sec. to the transmission interval $T_0$. In the temperature monitoring device of this embodiment, twelve temperature detectors 32 are used and, therefore, if the difference [n(0.1×N)] between transmission timing Tn and transmission interval $T_0$ is 1.2 sec. or greater (S4), then the transmission timing Tn is calculated subtracting 1.2 (S5).

Then, the control section 324 outputs a read command of temperature measurement data to the storing section 322 when Tn elapses from previous transmission timing Tn−1. The storing section 322 transfers the temperature measurement data to the transmission section 323 according to the read command. The transmission section 323 transmits wirelessly the temperature measurement data through the transmission antenna 323A (S6). The time required in transmitting temperature measurement data is about 15 msec. The control section 324 increments the transmission count number n after the transmission of temperature measurement data (S7), and calculates the transmission timing Tn again.

On the other hand, in calculating the transmission timing Tn, if the difference [n(0.1×N)] between transmission timing Tn and transmission interval $T_0$ is not 1.2 sec. or greater S4), then the transmission timing Tn is calculated by adding n(0.1) sec. to the transmission interval $T_0$ (S8).

Figure 9:
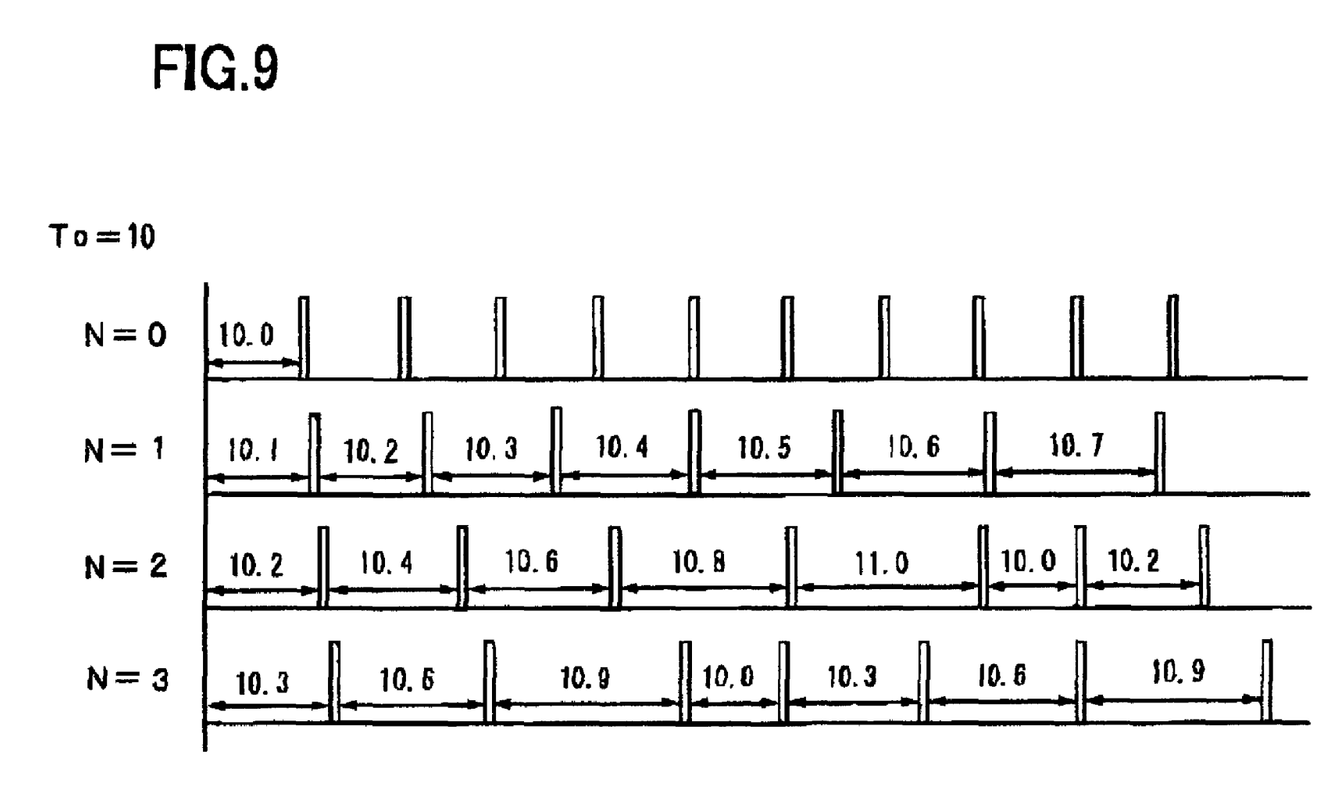
FIG. 9 is a timing chart showing transmit timing Tn of the temperature detector calculated by the control section.

FIG. 9 shows the transmission timing Tn calculated as to temperature detectors 32 having temperature detector numbers N=0 to 3 in case of transmission interval $T_0$=10 sec. For convenience of explanation, the transmission timings Tn at the first transmission (n=0) are made to coincide with one another. For example, with regard to temperature detector 32 of N=3, the fourth transmission timing $T_4$ is set to be 10 sec. after the previous transmission timing $T_3$. Thus, by changing transmission timing Tn as compared to previous transmission timing Tn−1, an interference with the transmission timing Tn of the other temperature detector 32 can be avoided. Although, in FIG. 9, transmission timing $T_9$ of N=0, transmission timing $T_6$ of N=2 and transmission timing $T_6$ of N=3 coincide with one another, the respective transmission timings Tn, in fact, do not coincide since the transmission start times of the respective temperature detectors 32 are different from one another. If the transmission interval $T_0$ is set such that each temperature detector 32 has different interval (e.g., transmission timing $T_0$=13 sec. for N=0, transmission timing $T_0$=12 sec. for N=1, transmission timing $T_0$=13 sec. for N=2 and transmission timing $T_0$=10 sec. for N=3), the coincidence of transmission timing Tn can be further effectively avoided.

(6) Storing Operation of Temperature Measurement Data

The reception station 5 receives temperature measurement data from the respective temperature detectors 32, then storing it into the temperature measurement data storing region 502A while classifying it for each temperature detector number.

(7) Transmission of Temperature Measurement Data to Wireless Terminal Device 6

When the control section 503 of reception station 5 receives the read command of temperature measurement data transmitted from the wireless terminal device 6 through the reception/transmission section 500, it reads out the temperature measurement data from the temperature measurement data storing region 502A and outputs it to the wireless terminal device 6 through the reception/transmission section 500 The wireless terminal device 6 can issue a read command to read out temperature measurement data relating to all temperature detectors 32 stored in the reception station 5 or a specific temperature detector 32 based on temperature detector number. The control section 610 of wireless terminal device 6 stores the temperature measurement data inputted through the reception/transmission section 600 into the storing section 609 while classifying it for each temperature detector number.

(8) Operation of Wireless Terminal Device 6

The control section 610 controls the LCD display section 608 to display the list of temperature detector number for temperature measurement data stored in the storing section 609. When viewing or analyzing the temperature measurement data stored, a temperature detector number can be selected by an input operation using, e.g., input pen. The input operation to the pen input section 603 provided in the LCD display section 608 is conducted by touching part of the LCD display section 608 where temperature detector number is displayed with the input pen. The control section 610 outputs a selection signal of temperature detector number corresponding to coordinates inputted to the pen input section 603. The storing section 609 outputs temperature measurement data corresponding to the selection signal to the LCD driver 607. The LCD driver 607 converts the temperature measurement data into display signal corresponding to characters, images etc. to display it on the LCD display section 608.

In the temperature monitoring device described above, the temperature detector 32 unidirectionally transmits, through radio wave, temperature measurement data obtained by measuring the temperature of cable clamp 31 with the temperature sensor 330, and the reception station 5 stores the received temperature measurement data into the temperature measurement data storing region 502A while classifying it for each temperature detector 32. Therefore, it is not necessary to provide the temperature detector 32 with a reception section and the temperature detector 32 needs only the transmission section used to transmit the temperature measurement data. Thus, antenna and device composition suitable for data transmission can be selected and the temperature detector 32 can have a smaller size, a reduced weight and a reduced power consumption Also, there is no trouble in transmission of temperature measurement data caused by that the temperature detector 32 cannot receive a transmission command under bad reception of radio wave. Therefore, the reliability of wireless transmission can be enhanced and the temperature monitoring can be conducted safely without having any monitored object limited during a long term.

In the embodiment described above, temperature measurement data stored in the temperature measurement data storing region 502A of reception station 5 is read out through the communication network 7 and wireless communication by the wireless terminal device 6. However, means for reading out temperature measurement data is not limited to the wireless communication. For example, a semiconductor memory composing the storing section 502 to store the temperature measurement data may be removed from the circuit in reception station 5 and then connected to a terminal device such as personal computer to read out and analyze the temperature measurement data stored.

Also, the lithium battery 61 included in the temperature sensor section 60 may be omitted while sharing the lithium battery 50 included in the watertight section 32E. In this case, by decreasing the number of battery, the temperature detector 32 can have a reduced weight and size. For example, the temperature sensor section 60 does not include the lithium battery 61 and, instead, can include a semiconductor chip with a memory for storing temperature measurement data such that the temperature measurement data is stored into the memory. In such a composition, the number of transmission may be reduced while increasing the transmission interval of temperature measurement data An alternative composition for receiving temperature measurement data from the reception station 5 with the wireless terminal device 6 may be that RF transceivers with low output power are connected to the reception station 5 and wireless terminal device 6 such that radio wave including temperature measurement data is received/transmitted through the RF transceivers. The RF transceiver available is a known wireless communication technique such as Bluetooth, HomeRF etc.

Also, by installing the RF transceiver on the temperature detector 32, temperature measurement data of the temperature detector 32 can be directly received with the wireless terminal device 6 without using the reception station 5.

Figure 10:
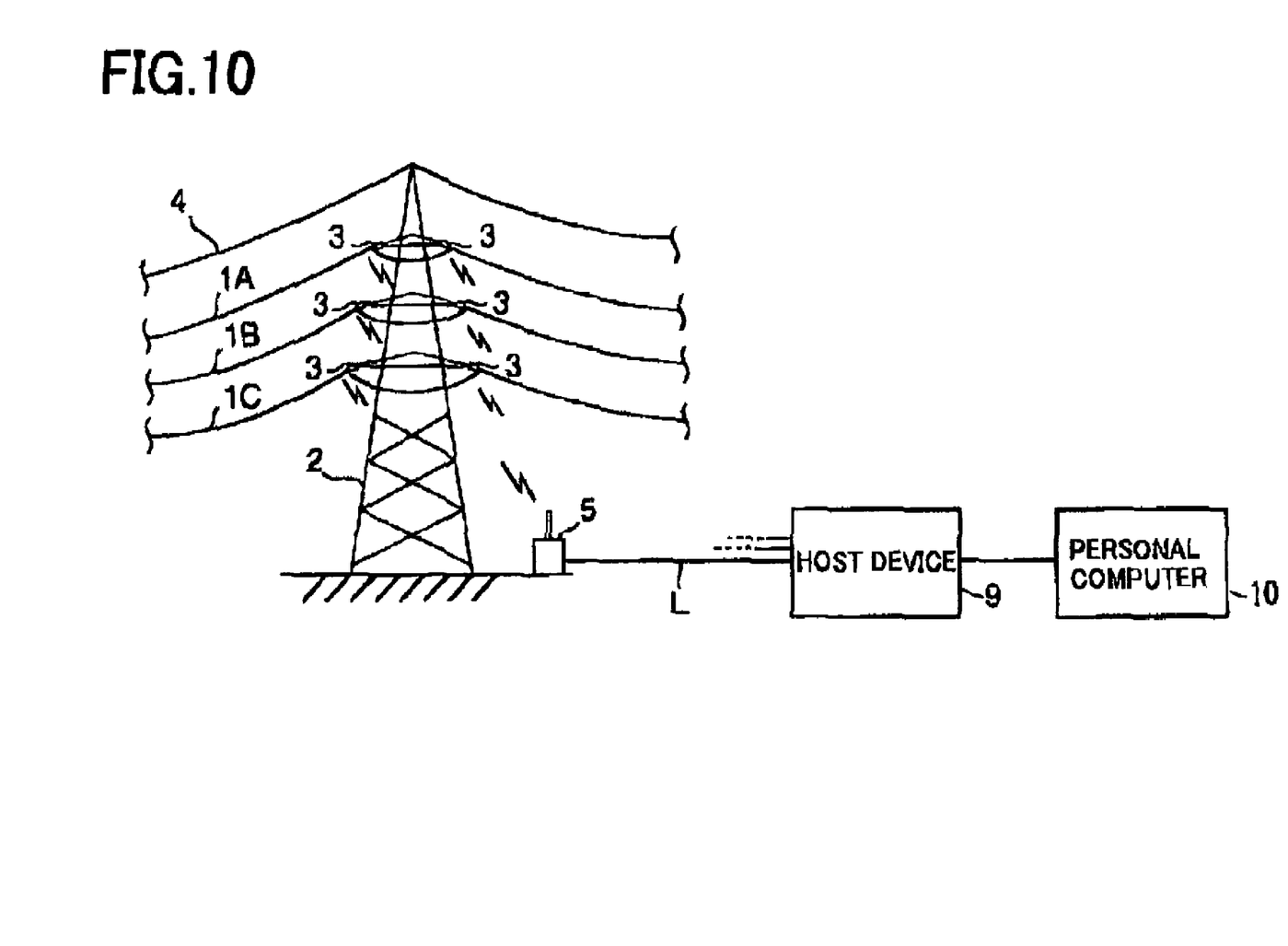
FIG. 10 is an illustration showing the other transmission system for transmitting temperature measurement data.

FIG. 10 shows another transmission system to transmit temperature measurement data stored in the reception station 5. It is composed of a host device 9 to be inputted of temperature measurement data through a signal line L from the reception station 5, and a personal computer 10 connected with the host device 9 to analyze temperature measurement data. The host device 9 is connected with the other reception station (not shown) through a signal line L and is provided with a protocol control section that can read out the temperature measurement data of a reception station to be designated based on an IP address sent from the personal computer 10. In this transmission system, by reading out temperature measurement data based on IP address, the transmission of temperature measurement data can be stabilized while avoiding the lowering of transmission characteristics such as interference and fading, thereby the monitoring of temperature can be stabilized.

Functions and effects obtained in the embodiment of the invention described above are as follows (1) The reception section becomes unnecessary due to the temperature detector 32 that transmits unidirectionally temperature measurement data corresponding to temperature of a monitored object through radio wave. This allows the antenna to have a reduced shape and size enough to conduct the data transmission, and therefore the entire device can be miniaturized. Also, since it conducts no reception operation, the power consumption can be reduced and therefore the monitoring of temperature can be conducted for a long term.

(2) The temperature detector 32 only has to be fixed on the cable clamp 31 such that thermometric surface of temperature sensor section 60 contacts closely the cable clamp 31. Thus, instead of the fitting 32A, the other fixing member (e.g., adhesive tape) may be used. If a fixing means using adhesion or magnetic force is used, the time and cost required for fixing can be reduced.

(3) The thermometric surface of temperature sensor section 60 is made to closely contact the cable clamp 31 by the spring force of signal input/output terminal 59A and ground terminal 59B. Therefore, even when a low frequency vibration occurs during AC transmission, the thermometric surface of temperature sensor section 60 can be closely contacted with the cable clamp 31. This allows stable detection of temperature.

(4) The twelve temperature detector 32 can be monitored by one reception station 5 without causing the coincidence of transmission timing since the transmission timing of temperature measurement data is set based on temperature detector number and time data of transmission interval assigned to the temperature detector 32.

(5) By the insulating member 64 with a good thermal conductivity inserted between the temperature sensor section 60 and the cable clamp 31, heat is uniformly transmitted from the cable clamp 31 to the thermometric surface of temperature sensor section 60. This prevents a failure in temperature detection due to dispersion of temperature in the thermometric surface. Also, it prevents occurrence of potential difference corrosion caused by the direct contact of temperature sensor section 60 and cable clamp 31. The insulating member 64 may be a film-shaped material attachable with adhesives or a paste-formed material.

(6) With regard to the wireless communication section 51 accommodated in the protective case 32C of temperature detector 32, the substrate 51B is positioned in the direction vertical to the power supplying direction of transmission line. This prevents occurrence of potential difference on the same substrate under conditions of strong electric field, and superposition of noise does not occur even in transmission at low power. Thus, the reliability of wireless transmission can be enhanced and therefore the wireless transmission of temperature measurement data can be stabilized.

(7) The power consumption required in temperature measurement can be reduced by that the temperature sensor section 60 uses the semiconductor chip 62 with semiconductor-type temperature sensor. The lifetime of lithium battery 50 can be thus elongated. Furthermore, the device size can be reduced since the device can use a smaller battery. If the lithium battery 50 is extremely exhausted, it is supposed that temperature rise in a place where the temperature detector 32 is located is extraordinary and some trouble in portion with the cable clamp 31 attached or transmission line occurs. Therefore, it is desired that the maintenance is conducted immediately.

Although, in the embodiment of the invention, the cable clamp 31 to support the transmission lines 1A, 1B and 1C to be fixed to the power transmission tower 2 is the temperature-monitored object, the invention can be also applied to the other temperature-monitored object located at a place that is difficult for maintenance workers to access in safety aspect, for example, a switch or bus bar in DC transforming station, a main circuit connection of transforming station etc., a non-conductive member such as insulator.

As described above, in the temperature monitoring device of the invention, the temperature measurement data of a monitored object measured by the temperature detector is unidirectionally transmitted to the reception station and the reception station stores the temperature measurement data while allowing the data to be read out. Therefore, the result of temperature measurement according to the state of monitored object can be obtained easily. The monitoring of temperature can be thus conducted safely and not costly without having any monitored object limited.

INDUSTRIAL APPLICABILITY

The temperature monitoring device of the invention is suitable to be used for such a monitored object that the on-site worker is subjected to a danger or difficulty in monitoring the temperature due to high altitude, high voltage and high field.

What is claimed is:

1. A temperature monitoring device, comprising:
   data transmitting means that includes a temperature sensor to measure temperature of a monitored object, and a substrate positioned in a plane that intersects the power supplying direction of a transmission line, said data transmission means transmitting wirelessly a temperature measurement data based on said temperature;
   data storing means that receives said temperature measurement data being transmitted wirelessly and stores said data into a storing region; and
   data acquiring means that outputs a read command of said temperature measurement data to said data storing means to acquire said temperature measurement data to said data storing means to acquire said temperature measurement data from said storing region.

2. The temperature monitoring device according to claim 1, wherein said data transmitting means includes an identification number storing section that stores an identification number to distinguish said data transmitting means from the other data transmitting means, and a calculation section that calculates a transmission timing of said temperature measurement data including said identification number based on said identification number.

3. The temperature monitoring device according to claim 1, wherein said data storing means transmits wirelessly said temperature measurement data based on said read command transmitted wirelessly from said data acquiring means.

4. The temperature monitoring device according to claim 1, wherein said data storing means transmits wirelessly said temperature measurement data through a signal line based on said read command sent through said signal line from said data acquiring means.

5. The temperature monitoring device according to claim 1, wherein said data storing means includes a protocol control section that controls a communication protocol used to connect with a communication network.

6. The temperature monitoring device according to claim 1, wherein said data acquiring means comprises one of a personal computer, a mobile phone and PDA (personal digital assistant) that can control a communication protocol used to connect with a communication network.

7. The temperature monitoring device according to claim 1, wherein said data acquiring means receives said temperature measurement data being wirelessly transmitted from said data transmitting means.

8. The temperature monitoring device according to claim 1, wherein said substrate comprises:
   a semiconductor circuit unit for performing a temperature measurement operation; and
   a wireless communication circuit.

9. The temperature monitoring device according to claim 8, wherein said wireless communication circuit serves as an antenna to transmit radio waves.

10. The temperature monitoring device according to claim 1, wherein said data transmitting means further includes:

a semiconductor device that has a control circuit to control power supplied to the data transmitting means.

11. The temperature monitoring device according to claim 1, wherein said data transmitting means further includes:
a memory that stores data for temperature measurement and data for a transmission operation.

12. The temperature monitoring device according to claim 1, further comprising:
a watertight section, said data transmitting means being positioned in said direction vertical to said power supply direction of said transmission line inside in said watertight section.

13. A temperature monitoring device, comprising:
a wireless communication section comprising a substrate having a surface positioned in a to plane that intersects the power supplying direction of a transmission line, said substrate surface comprising:
a circuit that performs a temperature measurement operation;
a circuit that performs wireless communication;
a circuit that controls power supplied to said wireless communication section; and
a memory that stores data for temperature measurement and wireless communication;
a temperature sensor section comprising a power supply, a semiconductor chip with a temperature sensor, and a thermal conduction member; and
a watertight section that houses said wireless communication section and a portion of said temperature sensor section.

14. The temperature monitoring device according to claim 13, wherein said temperature sensor section is detachably connected to said temperature monitoring device.

15. The temperature monitoring device according to claim 13, wherein said circuit for performing wireless communication further comprises an antenna for wireless transmission.

16. The temperature monitoring device according to claim 13, wherein the semiconductor chip with said temperature sensor stores a specific temperature sensor ID and an initial temperature detector number.

17. A temperature monitoring device, comprising:
a temperature sensor section to measure the temperature of a transmission line;
a sensor ID storage to store a temperature sensor ID and a temperature detector number of said temperature sensor section;
a power supply section to control power to said temperature monitoring device;
a control section to calculate results from said temperature sensor section;
a storing section to store time data of temperature measured interval, time data of transmission interval, and calculation results from said control section; and
a transmission section to wirelessly transmit temperature measurement data through a transmission antenna, said transmission section including a substrate positioned in a plane that intersects the power supplying direction of a transmission line.

18. The temperature monitoring device according to claim 17, wherein said temperature sensor section is detachably connected to said temperature monitoring device.

19. The temperature monitoring device according to claim 17, wherein said control section comprises:
a clock circuit to perform clock operations by counting a clock signal generated by a reference clock generator; and
a data input/output section to connect with an external terminal device.

* * * * *

UNITED STATES PATENT AND TRADEMARK OFFICE
CERTIFICATE OF CORRECTION

| | |
|---|---|
| PATENT NO. | : 7,336,202 B2 |
| APPLICATION NO. | : 10/475005 |
| DATED | : February 26, 2008 |
| INVENTOR(S) | : Sigekazu Kawai and Tsutomu Ishikura |

It is certified that error appears in the above-identified patent and that said Letters Patent is hereby corrected as shown below:

Title Page Item 22 change "Apr. 17, 2002" to --Jan. 24, 2002--.

In Claim 13 (the column 13, line 15) please delete "to" from the phrase of "in a to plane".

Signed and Sealed this

Second Day of September, 2008

JON W. DUDAS
*Director of the United States Patent and Trademark Office*